Jan. 31, 1961     V. H. SANNER ET AL     2,970,203
UNIVERSALLY ADJUSTABLE GUIDE FOR TUBES IN A TUBE MILL
Filed March 2, 1959     3 Sheets-Sheet 1

INVENTORS
VERYL H. SANNER
LEWIS H. RUPLE
BY
ATTORNEY

INVENTORS
VERYL H. SANNER
LEWIS H. RUPLE
BY Malcolm W. Fraser
ATTORNEY

Jan. 31, 1961 V. H. SANNER ET AL 2,970,203
UNIVERSALLY ADJUSTABLE GUIDE FOR TUBES IN A TUBE MILL
Filed March 2, 1959 3 Sheets-Sheet 3

INVENTORS
VERYL H. SANNER
LEWIS H. RUPLE
BY
Malcolm W. Fraser
ATTORNEY

United States Patent Office 2,970,203
Patented Jan. 31, 1961

2,970,203

UNIVERSALLY ADJUSTABLE GUIDE FOR TUBES IN A TUBE MILL

Veryl H. Sanner and Lewis H. Ruple, Toledo, Ohio, assignors to Abbey Etna Machine Company, Perrysburg, Ohio, a corporation of Ohio Filed Mar. 2, 1959, Ser. No. 796,507

5 Claims. (Cl. 219—59)

This invention relates to tube mills where a flat metallic ribbon is gradually formed into tubular form with the free edges in close juxtaposition, these edges being then welded together as the tube advances, thereby continuously to form a closed tube.

It is important that the edges of the tube to be welded be properly guided to the welding unit and that predetermined spacing of these edges be effected at a definite point so that the welding current will follow the correct path for achieving efficient welding. This is particularly the case in high frequency induction welding where not only must the tube edges be in exactly opposed relation but the throat created by the tube edges prior to passing between the welding or pressure rolls must be maintained uniformly as the tube progresses. If this is not carefully maintained uniformly the tube edges will not be uniformly seamed to effect a fluid tight joint.

An embodiment of the invention is shown by way of illustratiton but not of limitation on the accompanying drawings in which.

Figure 1:
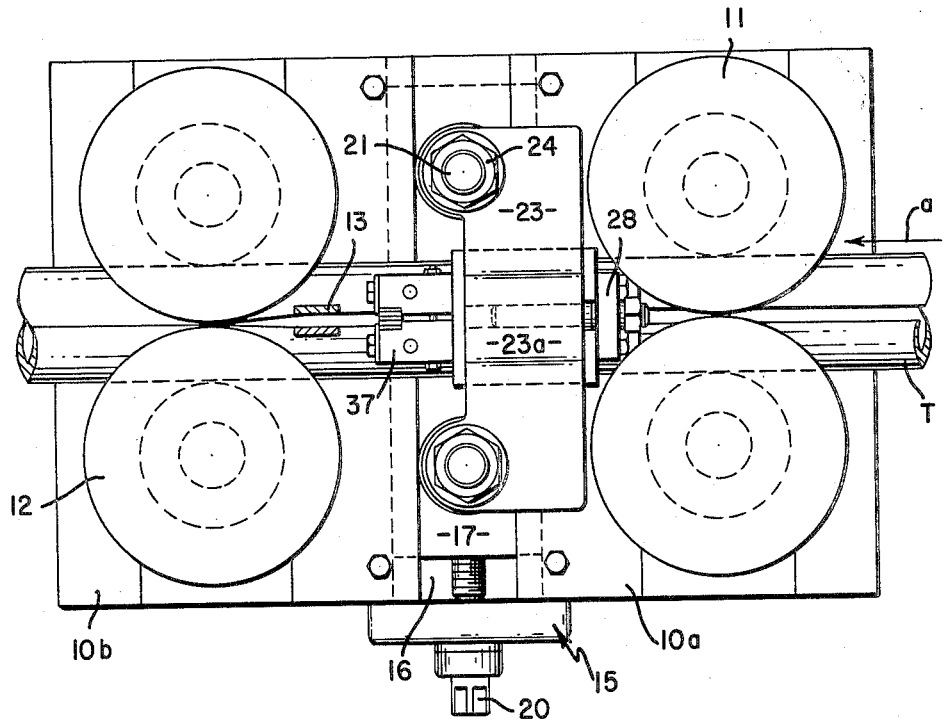
Figure 1 is a top plan view of a portion of a tube mill showing pairs of seam guide rolls and pressure or welding rolls through which the tube passes and between which is disposed a seam guide unit for guiding the spaced edges of the tube to be welded.
Figure 2:
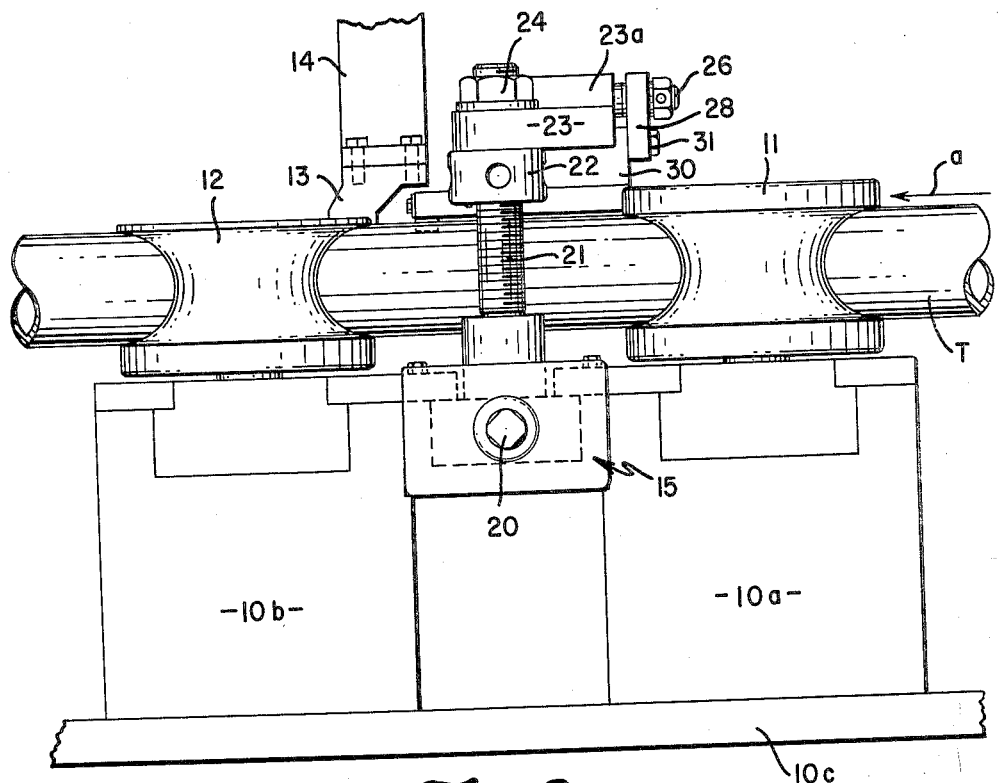
Figure 2 is a side elevation of the assembly shown in Figure 1.

The illustrated embodiment of the invention comprises a pair of supporting stands or pedestals 10a and 10b which are spaced from each other and are mounted on a bed 10c. Mounted on the stand 10a with their axes vertically disposed is a pair of seam guide rolls 11 which are contoured in the usual manner to fit the tube T which passes between them on its way to be seamed or welded. Mounted on the stand 10b is a pair of welding or pressure rolls 12 for pressing the tube T in such a manner that the edges are forced into contact with each other. It will be understood that the tube T travels in the direction of the arrow *a* appearing on Figures 1 and 2 and the opposed edges of the tube are brought together to be electrically welded in this instance by a pair of welding electrodes 13 which are disposed adjacent the welding rolls 12, these electrodes being suitably carried by a supporting arm 14 which suspends them in the desired position so that they contact the spaced edges of the tube T. Any suitable welding device may be employed for the purpose, such for example as rolling contacts, or high frequency induction coil.

It will be understood that the structure above described is old in the art and forms a part of a tube mill which receives the ribbon-like endless strip of metal which is gradually shaped into the form of a tube by passing successively between a series of forming rolls. Since such mechanism forms no part of the present invention, illustration and further description thereof are not regarded as necessary.

Figure 3:
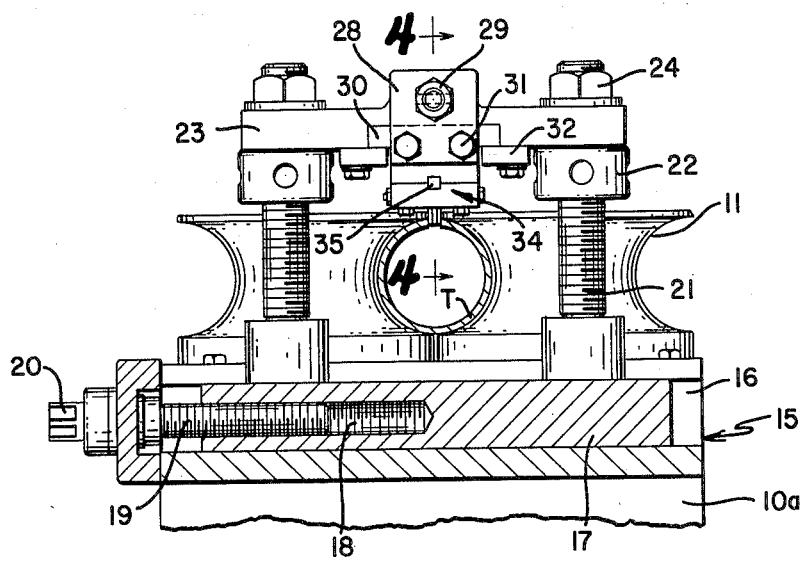
Figure 3 is a fragmentary vertical sectional elevation taken between the pairs of seam guide rolls and pressure or welding rolls and showing the seam guide unit disposed between the spaced edges of the tube to be welded.

In the space between the stands 10a and 10b and connected thereto is a guide plate support generally indicated at 15 and having a transverse guideway 16 in which a slide plate 17 is shiftable. As indicated on Figure 3 the slide plate 17 has a screw threaded socket 18 receiving an adjusting screw 19 which is held against axial movement at its outer end portion and has a wrench-receiving head 20 on the outside so that the plate 17 can be readily adjusted transversely relative to the stands. Suitably secured to the upper face of the slide plate 17 is a pair of laterally spaced vertically disposed screws 21 on the upper end portion of which are adjusting nuts 22. Fitting over the screws 21 and resting on the nuts 22 is a transverse bracket plate 23 which may be raised or lowered by adjustment of the nuts 22 as will be readily apparent. The bracket plate is clamped in position by clamping nuts 24 on the outer ends of the screws 21.

The bracket plate 23 is formed with a central enlarged portion 23a in which is formed a screw threaded bore 25 extending longitudinally and parallel to the tube T. The screw 26 has a reduced unthreaded neck 27 at the front end thereof to receive a vertically disposed hanger plate 28. On the outer end of the screw 26 is a nut 29. It will be understood that by adjustment of the screw 26 the plate 28 may be shifted forwardly or rearwardly parallel to the axis of the tube T.

The underside of the horizontal bracket plate 23 is grooved to receive a T-shaped slide block 30, to the upper end of which the hanger plate 28 is secured by screws 31. The slide block is held in position and guided by a pair of gibs 32 which are secured to the underside of the bracket plate 23 by screws 33. It will thus be apparent that by adjusting the screw 26 the slide block 30 is shifted relative to the bracket plate 23.

Figures 5, 8:
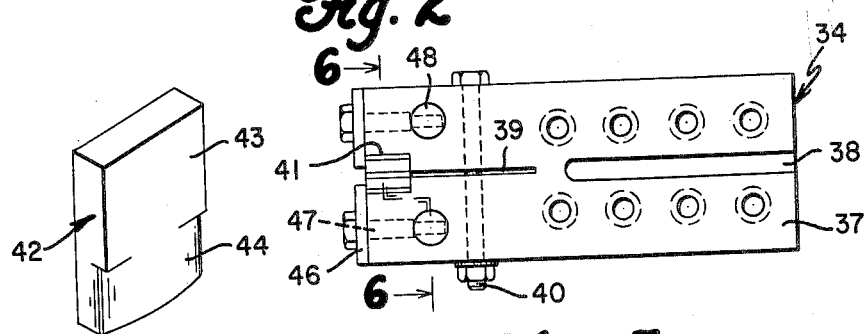
Figure 5 is a plan view of the guide plate assembly.
Figure 8 is an enlarged perspective view of one of the guide plates.
Figure 4:
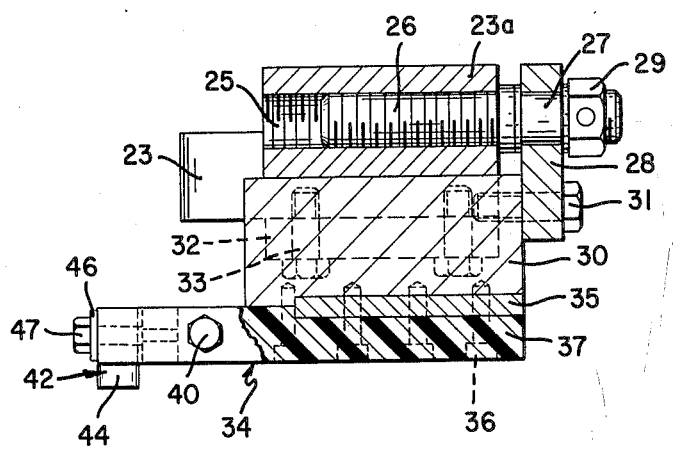
Figure 4 is an enlarged vertical sectional view substantially on the line 4—4 of Figure 3.

A guide plate assembly generally indicated at 34 is secured to the underside of the slide block 30 by a series of screws 36 and held from twisting relative thereto by a key 35. The guide plate assembly comprises an elongate flat plate 37 of a suitable plastic, such for example as melamine resin, and as shown it extends forwardly flatwise beyond the front edge of the slide block 30 (Figure 4). As shown in Figure 5 the top face of the plate 37 is formed with a groove 38 to receive a portion of the key 35, the slide block being similarly grooved for receiving another portion of the key. The front end portion of the plate 37 is separated into two parts or segments by a slit 39 and extending through the plate from side to side is a bolt and a nut assembly 40 for tightening the split portions together for a purpose hereinafter to appear.

At the front end portions of the split segments are internal notches, as indicated at 41, to receive guide plate elements. These comprise a pair of guide plates 42 each having an upper rectangular portion 43 disposed in the notched portions 41 and a lower depending contact portion 44, the outer side of which is rounded to engage the tube edges. By rounding the outer sides of these plates sharp edges are eliminated for tube engagement.

Figure 6:
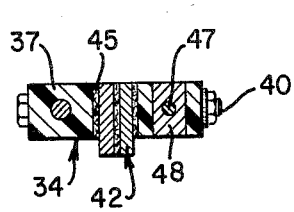
Figure 6 is a transverse sectional view substantially on the line 6—6 of Figure 5.
Figure 7:
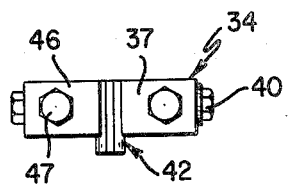
Figure 7 is a front end elevation of the guide plate assembly shown in Figure 5.

The guide plates 42 are of a hard metal, such as sintered carbide, for resisting the abrasive contact with the edges of the tube T. As shown in Figure 6, electrical insulation 45 is disposed between the plates 42 and also between the plates and the sides of the notches 41. Such insulation may take the form of glass fiber phenolite. For holding the guide plates 42 in position, end plates 46 abut flatly against the outer ends of each split segments of the plate 37 and screws 47 retain these plates in position. The ends of the screws threadedly engage brass inserts 48 in the plate 37. It will thus be apparent that the lower end portions of the guide plates 42 depend from the plate 37 and extend into the space between the edges of the tube T and space these edges from each other a proper distance before these edges are engaged by the welding electrodes 13.

From the above, it will be manifest that the guide plates 42 enter the space between the tube edges and snugly fit therein so that the rounded sides 44 thereof not only effect the proper spacing of these edges but guide them properly to the welding electrodes 13 which are in contact therewith. Thus the welding or pressure rolls 12 press the tube edges into engagement and the tube edges from the rolls 12 to the guide plates 42 form a V of the proper dimension to insure that the induction currents pass properly to effect efficient welding.

The mounting is such that the guide plates 42 may be universally adjusted. Adjustment transversely of the tube T can be made by the screw 19 while up and down adjustments are made by the nuts 22. To and fro adjustments parallel to the tube axis are made possible by the screw 26. Thus all necessary adjustments can be readily made in order accurately to position the guide plates with respect to the welding rolls 12 and welding electrodes. These adjustments are all conveniently accessible from the outside of the tube mill and can be manipulated during operation of the mill.

The guide plates 42 are designed to minimize abrasive wear not only by selection of a hard and tough material but also by the rounded contour of the contacting side surfaces 44. These parts can be readily replaced as occasion demands by loosening the bolt and nut assembly 40 and removal of the retaining end plates 46.

Numerous changes in details of construction, assembly and choice of materials may be effected without departing from the spirit of the invention especially as defined in the appended claims.

What we claim is:

1. In a tube mill having spaced pairs of seam guide and welding rolls between which a formed tube passes with the edges thereof spaced apart until reaching the welding rolls and a welding unit disposed in advance of the welding rolls for fusing the metal at the tube edges before entering the welding rolls, a device engaging the tube edges between the pairs of rolls for guiding the same to the welding unit, said device comprising a holder, a pair of plates depending from said holder for entrance in the space between the tube edges, and means for removably mounting said plates in said holder, and a series of means for universally adjusting said tube engaging device for insuring the spacing and guiding of the tube edges properly relative to the welding unit and welding rolls.

2. The organization as claimed in claim 1 in which the sides of the plates which engage the edges of the tube are rounded for reducing frictional contact.

3. The organization as claimed in claim 1 in which electrical insulation is disposed between the plates and between the plates and the holder.

4. In a tube mill having spaced pairs of seam guide and welding rolls between which a formed tube passes with the edges thereof spaced apart until reaching the welding rolls and a welding unit disposed in advance of the welding rolls for fusing the metal at the tube edges before entering the welding rolls, a device engaging the tube edges between the pairs of rolls for guiding the same to the welding unit, a holder for said tube edge engaging device in the form of a flat plate of electrical insulating material arranged flatwise over the tube to be welded, the front end of said plate being bifurcated, the tube edge engaging device being in the form of a pair of plates of tough material of the order of sintered carbide, means for clamping said plates in the bifurcated end of insulating plate so that the tube engaging plates depend therefrom into the space between the tube edges and a support for said holder including pedestal-like members straddling the tube.

5. In a tube mill as defined in claim 4 including a series of means for effecting vertical, transverse and longitudinal adjustments respectively of said flat plate thereby accurately to position the tube edge engaging plates with respect to the tube to be welded.

References Cited in the file of this patent

UNITED STATES PATENTS

| | | |
|---|---|---|
| 2,196,106 | Darner | Apr. 2, 1940 |
| 2,762,902 | Hankin | Sept. 11, 1956 |